D. P. BLISS.
RECIPROCATING CHURN.
No. 185,663.                  Patented Dec. 26, 1876.
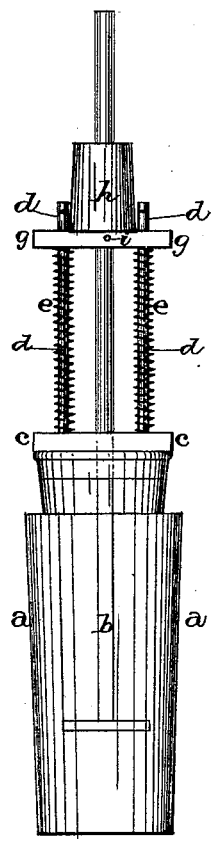
WITNESSES:
INVENTOR:
David P. Bliss.
per
F. A. Lehmann, Atty.

UNITED STATES PATENT OFFICE.

DAVID P. BLISS, OF SPARTA, OHIO.

IMPROVEMENT IN RECIPROCATING CHURNS.

Specification forming part of Letters Patent No. 185,663, dated December 26, 1876; application filed November 27, 1876.

*To all whom it may concern:*

Be it known that I, DAVID P. BLISS, of Sparta, in the county of Morrow and State of Ohio, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in churns; and it consists in the peculiar arrangement of the two springs, the weight, and their frame upon the top of the churn, whereby the labor of operating the dasher is made much easier, as will be more fully described hereinafter.

The accompanying drawing represents my invention.

$a$ represents the churn, and $b$ the dasher, both of ordinary construction. Placed upon the top of this churn, over the cover, is a flat piece of wood, $c$, which has a hole through its center, to allow the handle of the dasher to pass through. Rising from each end of this piece, on each side of the handle, is a rod, $d$, around which is placed a coiled spring, $e$, and over the upper ends of both of the rods is passed the rest $g$, which is supported in position by the two springs $e$. Passing through the center of this rest, and fastened thereto by means of any suitable device, $i$, is the dasher-handle, and passing down over the top of this handle is a weight, $h$, which rests upon the rest $g$. This weight should be so proportioned to the strength of the springs that the springs will promptly raise the weight and dasher up again after they have once been depressed; but the springs should cause very little exertion to be made in forcing the dasher downward.

I am aware that a coiled spring has been placed around the dasher-handle, for the purpose of raising the dasher upward after it has been depressed; but a spring that is placed around the handle always gets wet and dirty from the cream that splashes through the hole in the cover, and as the spring cannot be wiped dry without a great deal of trouble it is soon so eaten by the rust as to become weak and worthless. By placing the springs on each side of the handle, as above described, they are not only prevented from being thus injured, but the whole device is made stronger and to work the more readily.

Having thus described my invention, I claim—

In combination with a churn, $a$, of the piece $c$, rods $d$, and springs $e$, placed on each side of the dasher, the rest $g$, fastened to the dasher, and weight $h$, substantially as shown and described.

In testimony that I claim the foregoing I have hereunto set my hand and seal this 22d day of November, 1876.

DAVID P. BLISS. [L. S.]

Witnesses:
 P. C. BEARD,
 W. C. HARRIS.